Oct. 21, 1941.　　　G. H. TAYLOR　　　2,260,240
PISTON AND CONNECTING ROD CONSTRUCTION
Filed Aug. 16, 1938　　　2 Sheets-Sheet 2
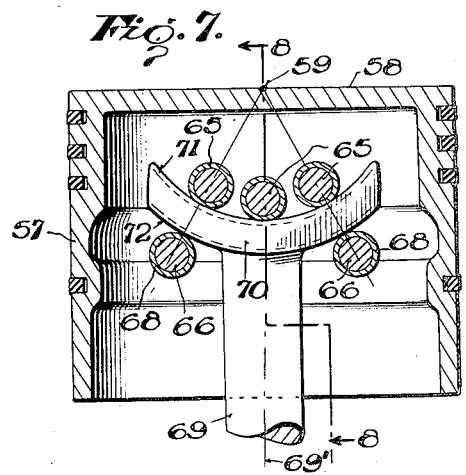
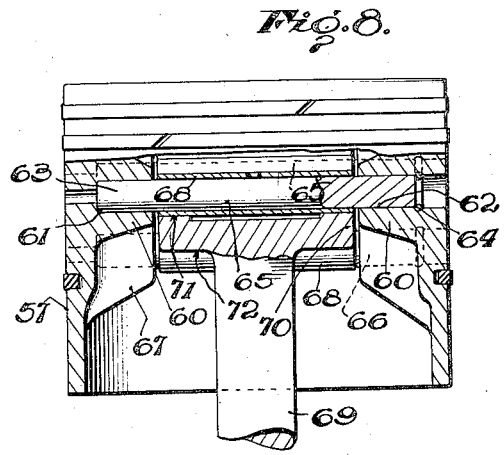
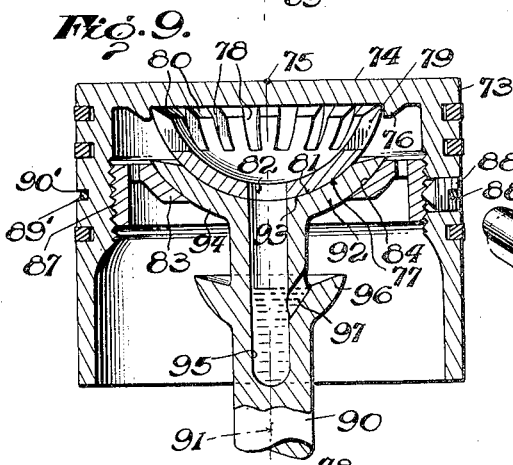
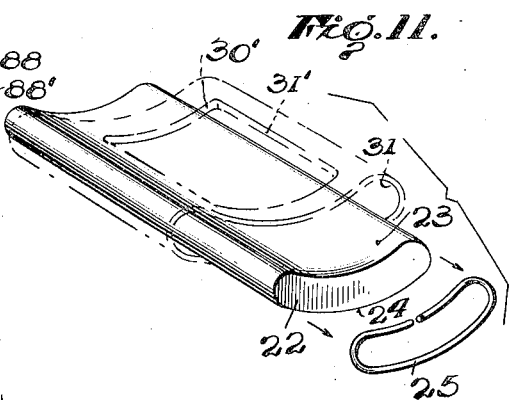
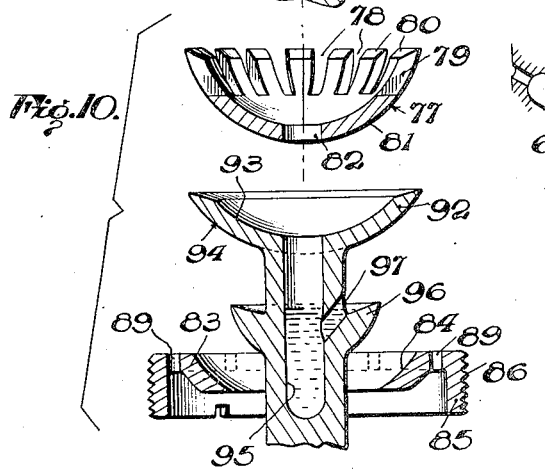
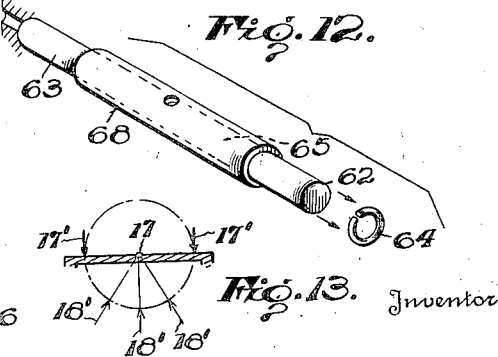
Inventor
George H. Taylor.
By B. M. Thorne
Attorney Patented Oct. 21, 1941

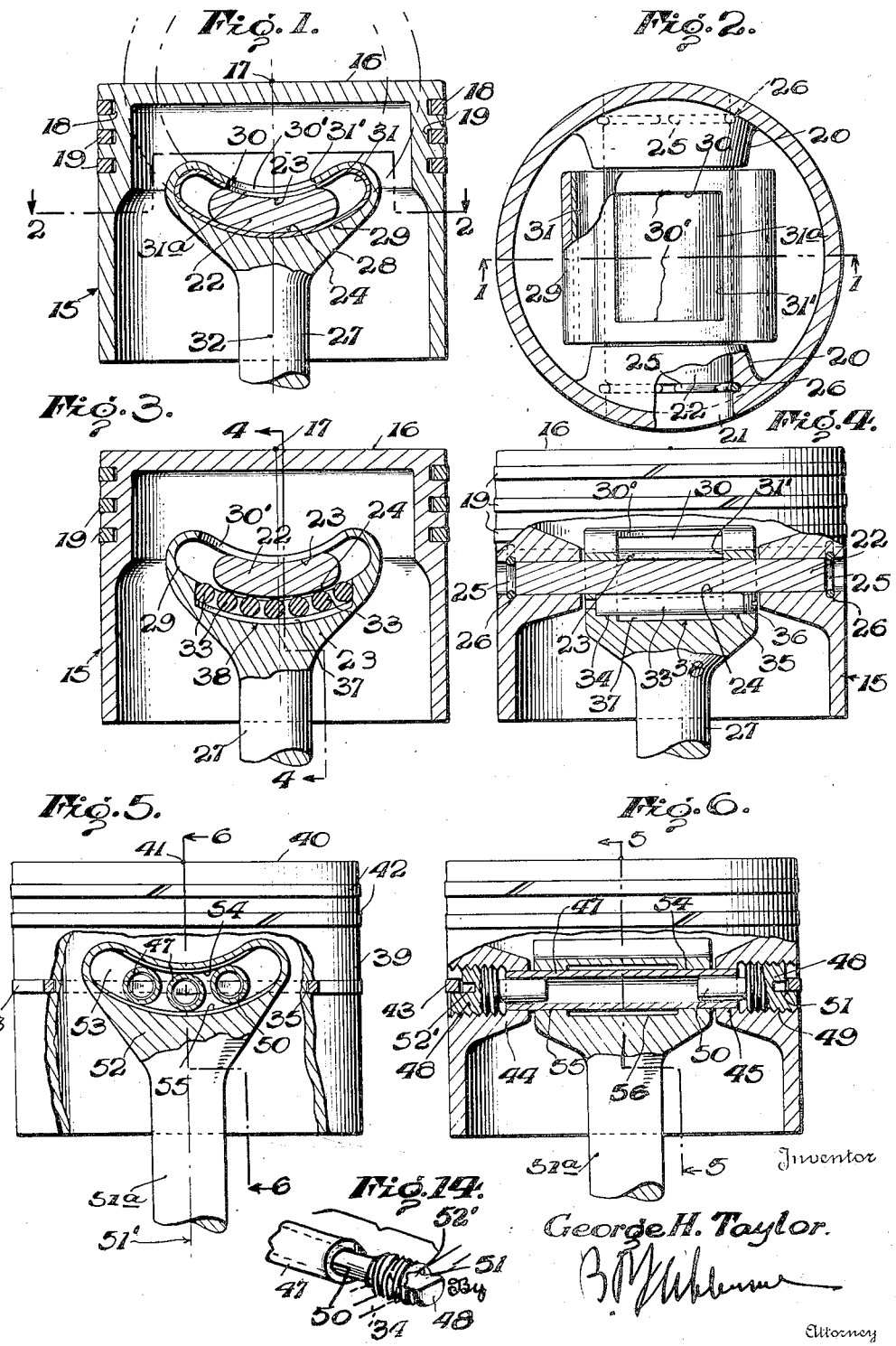

2,260,240

UNITED STATES PATENT OFFICE 2,260,240

PISTON AND CONNECTING ROD CONSTRUCTION

George H. Taylor, Norfolk, Va., assignor to Metallic Tag Company, Inc., Richmond, Va., a corporation of Virginia Application August 16, 1938, Serial No. 225,231

6 Claims. (Cl. 309—19)

My invention relates to a piston and connecting rod construction, for engines, pumps or the like.

An important object of the invention is to provide means for so connecting the connecting rod with the piston that the force applied to the piston tending to move it, and the load applied to the piston, opposing such movement, will result in no tendency of the piston to tilt during its reciprocatory movement, eliminating wear, to the maximum extent.

A further object of the invention is to provide means for connecting the connecting rod with the piston so that the central longitudinal axis of the connecting rod remains permanently in alignment with the center of the working face of the piston, thereby eliminating tilting of the piston during reciprocation.

A further object of the invention is to provide means of the above mentioned character for connecting the connecting rod and piston, which means is of simple construction, durable and strong.

A further object of the invention is to provide connecting means of the above mentioned character having the minimum frictional engagement between its parts.

A further object of the invention is to provide means for effecting a universal connection between the connecting rod and piston, which will retain the central longitudinal axis of the connecting rod in permanent alignment with the center of the working face of the piston.

A further object of the invention is to provide means for effecting such universal connection, and which will afford adequate lubrication for the engaging parts, and also effect a reduced heat exchange.

Other objects and advantages of the invention will be apparent during the course of the following description.

In the accompanying drawings forming a part of this application and in which like numerals are employed to designate like parts throughout the same:

Figure 1 is a central vertical longitudinal section through a piston, connecting rod, and connecting means between the rod and piston, Figure 2 is a horizontal section taken on line 2—2 of Figure 1, Figure 3 is a central vertical section through a piston, connecting rod, and connecting means between the same, embodying a second modification of the invention, Figure 4 is a vertical section taken on line 4—4 of Figure 3, Figure 5 is a side elevation of a piston, connecting rod, and connecting means between the same, parts broken away, and parts in section, on line 5—5 of Figure 6, of a third modification of the invention, Figure 6 is a vertical section taken on line 6—6 of Figure 5, Figure 7 is a central vertical section through a piston and connecting means, with the connecting rod in side elevation, of a fourth form of the invention, Figure 8 is a vertical section taken on line 8—8 of Figure 7, Figure 9 is a central vertical section through a piston, connecting rod, and connecting means between the same, of a fifth form of the invention, Figure 10 is a similar view, showing the parts in exploded relation, Figure 11 is a perspective view of the segmental connecting element shown in Figure 1, Figure 12 is a perspective view of one of the rollers shown in Figure 8, and, Figure 13 is a diagrammatic view of the piston and connecting rod.

Fig. 14 is an isometric view of one of the plugs and a tubular pin, used in the modification illustrated in Figures 5 and 6.

Attention being called first to Figures 1 and 2, the numeral 15 designates a piston, such as a piston of an internal combustion engine. The present invention is also applicable to the piston of other fluid expansion engines and to the pistons of pumps. The piston 15 reciprocates in the usual cylinder and has a working face 16, having a center point 17. The piston 15 is provided near its upper closed end with grooves 18 receiving the usual compression rings 19.

The piston 15, which is preferably hollow, is provided with diametrically opposite arranged webs 20, having segmental openings 21, formed therein, and these openings lead through the periphery of the piston. The openings 21 receive a segmental connecting element 22, having an inner cylindrically curved concave face 23 and an outer cylindrically curved convex face 24. The cylindrically curved faces 23 and 24 are concentric and they are defined by arcs having the center point 17 as their center. The segmental connecting element 22 is inserted through either of the openings 21 and is held in place by resilient split wire loops 25, engaging adjacent to the end of the connecting element 22 within grooves 26. Any other suitable means may be employed to retain the segmental connecting element 22 in place.

The numeral 27 designates a connecting rod connected in the usual manner with the crank shaft and this connecting rod is provided at its opposite or inner end with a head 28, having a recess 29 which is segmental in cross-section, and the opposite sides of this recess are cylindrically curved, or concentric, and are formed by arcs having the point 17 as the center. The upper or inner side of the recess 29 is preferably cut away to provide an opening 30, having end walls 30' and side walls 31'. The numeral 31 designates a lining or bushing, having oppositely arranged cylindrically curved faces, corresponding to the curvature of the faces of the recess 29 and the faces 23 and 24 of the connecting member 22. The inner face of the bushing has an opening 31a, corresponding to the opening 30. The connecting rod 27 has a central longitudinal axis 32.

In view of the foregoing description, it is obvious that as the connecting rod 27 travels with the crank shaft, it will swing laterally while reciprocating longitudinally and will swing about the cylindrically curved faces which are concentric and formed upon arcs having the center point 17 as a center. As a result of this arrangement, the central longitudinal axis of the connecting rod is in permanent alignment with the center point 17, whereby the force of the work tending to oppose the power stroke of the piston will be exerted along the line 32 passing through the center point 17 of the working face of the piston. The force applied to the piston upon its working face 16, upon the power stroke will therefore be applied at equal distances upon opposite sides of the center point 17. In Figure 13, the center point is shown at 17, while the forces upon the power stroke are indicated by the arrows 17', while the load is indicated by any of the arrows 18', depending upon the tilted position of the connecting rod. It is thus apparent that since the force from the load is applied through the center point 17, that the tendency of the piston to tilt is eliminated, thereby reducing the binding action and wear to the minimum.

In Figures 3 and 4, I have shown a second form of the invention. In this form of the invention, the bushing or lining 31 is omitted, and the upper or inner face of the connecting element 22 engages directly with the inner face of the recess 29, while the lower or outer face 24 of the connecting element 22 engages with rollers 33, arranged in a cylindrically curved group, which group is concentric to the cylindrically curved face 24 and is formed in an arc having the point 17 as its center. The rollers 33 are spaced and are rotatably mounted in cylindrical openings 35, and may be held against longitudinal displacement by plugs 36 or the like. These rollers operate within a recess 37, having a bottom wall 38, spaced from the rollers, whereby the rollers produce the minimum friction. All other parts of the head 28 and piston are identical with that shown in Figures 1 and 2.

In Figures 5 and 6, I have shown a third form of the invention, wherein the numeral 39 designates a piston, having a working face 40, having a center point 41. The piston has upper compression rings 42 and a lower compression ring 43. The piston 39 has interior webs 44, provided with cylindrical openings 45, to rotatably receive tubular pins 47. These pins are inserted through either opening 46 and are held in place by plugs 48, engaging in screw-threaded openings 49. The plugs carry cylindrical trunnions 50, projecting into the tubular pins 47. The outer ends of the plugs are cut away to form recesses 51, for receiving the ring 43. This ring holds the plugs against turning. Each plug has a hole 52' to receive a turning tool.

In this form of the invention, the connecting rod 51a has a head 52, provided with a recess or opening 53, which is segmental in cross-section, having cylindrically curved oppositely arranged inner walls 54 and 55. These walls are concentric and formed upon arcs having the center point 41 as a center. The tubular pins 47 engage the walls 54 and 55. The head 52 is recessed at 56.

In view of the description of the invention in connection with Figures 5 and 6, it is apparent that the central longitudinal axis of the connecting rod 51a remains in permanent alignment with the center point 41.

In Figures 7 and 8, I have shown a further modification of the invention wherein the numeral 57 designates the piston, having a working face 58 provided with a center point 59. Arranged within the piston 57 are upper webs 60, having openings 61 and 62, receiving rotatable pins 63, held in place by split rings 64 or the like. These pins preferably carry bushings or tubes 65. The pins 63 are arranged in a cylindrically curved group, which group is formed upon the arc of the circle having the center point 59 as its center. The numeral 66 designates rotatable pins of a second group, mounted upon webs 67, in the same manner that the pins 63 are mounted upon their webs 60 and the rotary pins 66 preferably have rotatable bushings or tubes 68. The pins 66 are disposed in a cylindrically curved group, spaced from the group of pins 63, and the second group is formed in the arc of the circle having the center point 59 as its center. The numeral 69 designates a connecting rod, having a head 70 provided with cylindrically curved faces 71 and 72, coacting with the groups of pins 63 and 66 respectively. The cylindrically curved faces 71 and 72 are formed in arcs of circles having the center point 59 as their center. The central longitudinal axis 69' of the connecting rod remains in permanent alignment with the center point 59, as shown.

In Figures 9 and 10, I have shown means for effecting a universal connection between the connecting rod and piston and for maintaining the central longitudinal axis of the connecting rod in permanent alignment with the center point of the working face of the piston. In these figures the numeral 73 designates a piston, having a working face 74 provided with a center point 75. Formed upon the inner surface of the closed end of the piston is an annular flange 76, for receiving therein the large end of a spherically curved bearing element 77. The large end of this bearing element is slotted at 78, producing spaced fingers 79, beveled at 80. The function of this arrangement is to reduce the contact area of the bearing element 77 and the piston, thereby lowering the heat exchange. The bearing element 77 has an outer or lower convex spherically curved face 81, formed upon a circle having the center point 75 as its center. Bearing element 77 is provided in its lower end with an opening 82, for the passage of oil. The numeral 83 designates a spherically curved companion bearing element, arranged opposite the bearing element 77, and having an upper concave spherically curved face 84 formed upon a circle having the center point 75 as its center. The faces 81 and 84 are spaced and concentric. The bearing element 83 is carried by a ring 85, which is externally screw-threaded at 86 to engage within the screw-threaded portion 87 of the piston and thereby clamped in position by a set screw 88 or the like. This set screw has a groove 88' to receive a lock ring 89' held in a groove 90'. The bearing element 83 and the ring 86 are integral and there are spaced openings 89 for the passage of oil.

The numeral 90 designates a connecting rod having a central longitudinal axis 91. This connecting rod is provided at its upper end with a spherically curved coupling element 92, having an inner or upper spherically curved concave face 93 and a lower or outer spherically curved convex face 94. These faces are spaced and concentric. The coupling element 92 is arranged between the bearing elements 77 and 83 and contacts therewith. The spherically curved faces 93 and 94 are formed upon circles which have the center point 75 as their center. The connecting rod 90 is provided in its upper end with an oil well 95, in communication at its top with the opening 82. An oil cup 96 is formed upon the connecting rod 90 and leads into an inclined port 97, communicating with the oil well. The oil cup catches the oil, during the splashing of the lubricant and the oil is conducted through the part 97 into the oil well and from this oil well it is splashed upon bearing elements 77 and 83 and the coupling element 92, to retain these parts properly lubricated. The lower end of the connecting rod 90 is suitably connected with the crank shaft of the engine.

In view of the foregoing description, it is obvious that the connecting rod 90 will turn with respect to the piston in a spherical or circular path having for its center the center point 75 of the piston. By this means, the central longitudinal axis 91 of the connecting rod remains permanently in alignment with the center point 75. A further advantage of this construction is that a universal connection is effected between the piston and connecting rod which will permit the piston to turn upon its longitudinal axis in the cylinder to distribute wear.

It is to be understood that the forms of my invention herewith shown and described are to be taken as preferred examples of the same and that various changes in the shape, size and arrangement of parts, may be resorted to, without departing from the spirit of the invention or the scope of the subjoined claims.

Having thus described my invention, I claim:

1. A piston, a segmental connecting element secured to the piston and having oppositely arranged outer concentric concave and convex contact faces, a connecting rod, and a head carried by the connecting rod and having a segmental recess formed therein to receive the connecting element, said recess having oppositely arranged inner concentric concave and convex contact faces for coaction with the first named contact faces.

2. A piston having openings in its periphery, a segmental connecting element secured to the piston by insertion within said openings and having cylindrically curved oppositely arranged outer convex and concave contact faces, a connecting rod, a head carried by the connecting rod, said head having a segmental recess provided with oppositely arranged cylindrically curved concentric inner convex and concave contact faces to coact with the first named contact faces, one face of the head having an opening for the passage of lubricant.

3. A piston having openings near its periphery, a segmental connecting element secured to the piston by insertion within the openings and having cylindrically curved oppositely arranged outer convex and concave contact faces, a connecting rod, a head carried by the connecting rod, said head having a segmental recess provided with oppositely arranged cylindrically curved inner convex and concave contact faces to coact with the first named contact faces.

4. A piston having a working face provided with a center point, said piston being provided near its periphery with openings, a segmental connecting element secured to the piston by insertion within said openings and having concentric cylindrically curved oppositely arranged other convex and concave contact faces, a connecting rod, a head carried by the connecting rod, said head having a segmental recess provided with oppositely arranged cylindrically curved concentric inner convex and concave contact faces to coact with the first named contact faces, all of the cylindrically curved contact faces having the center point of the working face as a common center so that the central longitudinal axis of the connecting rod is in permanent alignment with such center point.

5. A piston having openings near its periphery, a segmental connecting element secured to the piston by a longitudinal movement of the connecting element for inserting the same within the openings, said segmental connecting element having cylindrically curved oppositely arranged outer convex and concave contact faces, a connecting rod, a head carried by the connecting rod, said head having a segmental recess provided with oppositely arranged cylindrically curved inner convex and concave contact faces to coact with the first named contact faces and bearing elements arranged between adjacent contact faces of the connecting element and head.

6. A piston having alined recesses near its periphery, one recess passing through the periphery, a segmental connecting element secured to the piston by insertion within the recesses, said segmental connecting element having cylindrically curved oppositely arranged outer convex and concave contact faces, a connecting rod, a head carried by the connecting rod, said head having a segmental recess provided with oppositely arranged cylindrically curved inner convex and concave contact faces to coact with the first named contact faces.

GEORGE H. TAYLOR.